United States Patent [19]
Sekitou

[11] Patent Number: 5,732,418
[45] Date of Patent: Mar. 31, 1998

[54] PORTABLE-TYPE-SIMPLIFIED TOILET

[76] Inventor: Chikaku Sekitou, 6-16-13, Shingai-cho, Fukumaya-shi, Hiroshima-ken, Japan

[21] Appl. No.: 623,200

[22] Filed: Mar. 28, 1996

[30] Foreign Application Priority Data

Mar. 29, 1995 [JP] Japan ................... 7-003651

[51] Int. Cl.⁶ ........................................ A47K 11/02
[52] U.S. Cl. ........................ 4/449; 4/484; 229/125.17
[58] Field of Search ..................... 4/449, 476, 479, 4/483, 484; 229/125.17, 125.28, 108.1, 110

[56] References Cited

U.S. PATENT DOCUMENTS

| | | | |
|---|---|---|---|
| 2,151,761 | 3/1939 | Hartman | 229/110 X |
| 2,726,803 | 12/1955 | Ketler | 229/125.17 X |
| 2,736,485 | 2/1956 | Rabby | 229/125.28 X |
| 3,118,146 | 1/1964 | Dorey | 4/484 X |
| 3,600,719 | 8/1971 | Karr | 4/484 X |
| 5,524,301 | 6/1996 | McGire | 4/476 X |

FOREIGN PATENT DOCUMENTS 2638628  5/1990  France ........................ 4/483

*Primary Examiner*—Charles E. Phillips
*Attorney, Agent, or Firm*—Browdy and Neimark

[57] ABSTRACT

A portable-type simplified toilet comprises a foldable main body of a cylinder shape formed by butting end-to-end portions of a corrugated board cut in a band-like shape and then adhering the butted ends to each other in an overlapped state, the main body having engaging window holes bored in lower portions of a peripheral wall of the main body so as to be positioned at equal distances from an imaginary line in the longitudinal direction of the main body, and a bottom board separately made of a corrugated board and having a fold line extending in the longitudinal direction and engaging projection pieces projecting from the peripheral edge so as to be positioned at equal distances from the fold line, the engaging projection pieces being inserted into the engaging window holes.

4 Claims, 6 Drawing Sheets

FIG. 8
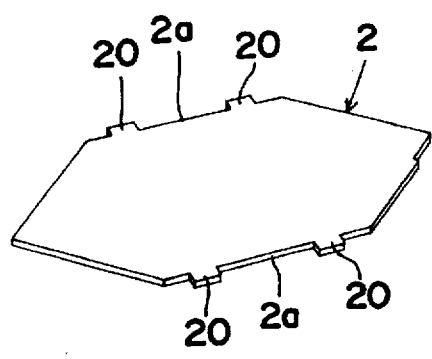
FIG. 9
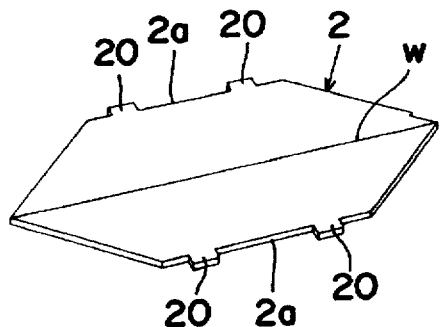
FIG. 10
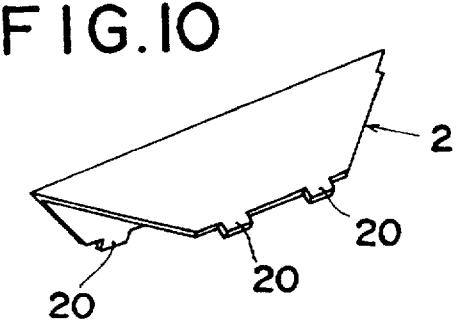
FIG. 12
FIG. 11
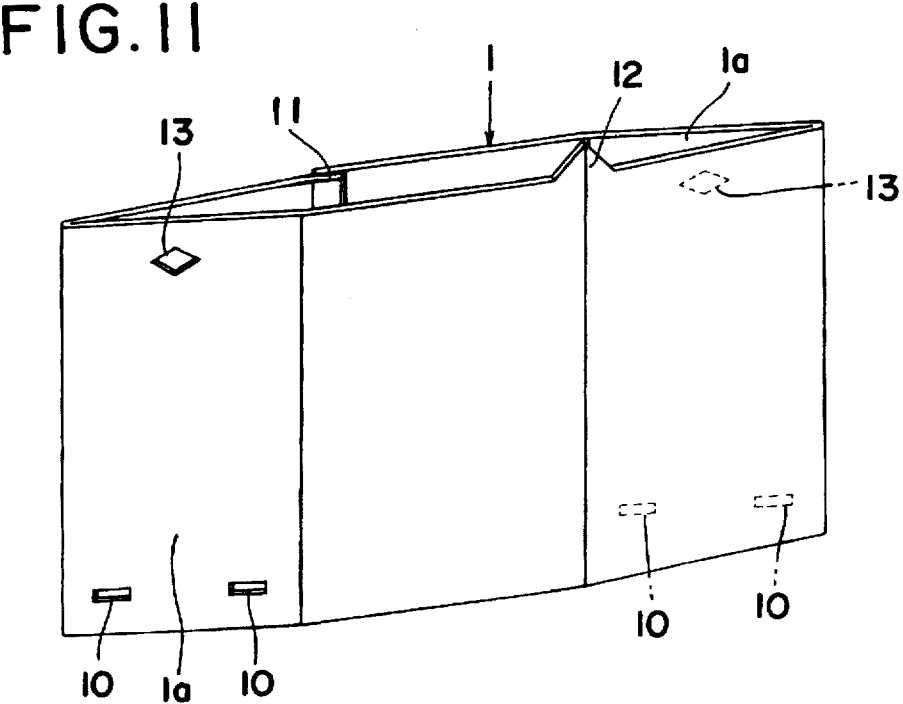

PORTABLE-TYPE-SIMPLIFIED TOILET

BACKGROUND OF THE INVENTION

1. Field of the Invention

This invention relates to an improved portable-type simplified toilet which is can to be carried into a compartment of an automobile or a bedroom or like desired places, and to be simply assembled on the spot for use.

2. Description of the Prior Art

As shown in FIG. 1, a portable-type simplified toilet capable of being assembled and disassembled has a main body 1 of a roughly hexagonal cylinder shape. The main body 1 is formed as follows. A band-like board material consisting of a corrugated board cut in a predetermined shape by means of blanking is rolled such that a longitudinal direction of the material is turned into a circumferential direction thereof, and butted ends of the material are adhered to each other to form the main body 1 having an annularly peripheral wall. This portable-type simplified toilet has also a bottom board 2 of a roughly hexagonal shape in plan. The bottom board 2 is formed by separately cutting a corrugated board by means of blanking. In assembly, the bottom board 2 is bent in an inverse V-letter shape in front along a fold line w predetermined at the center which defines the left and right sides of the bottom board. In this state, the bottom board 2 is inserted into the main body 1 so as to be forced therein from under the main body 1. Each of six side edges of the bottom board 2 has an engaging projection piece 20 which is inserted into each engaging window hole 10 preliminarily bored in a lower end of each of six wall surfaces of the peripheral wall of the main body 1 of the roughly hexagonal cylinder shape as described above. After the insertion of the projection pieces, the center portion of the bottom board 2 in the bent state is pressed down to restore the bottom board 2 to its flat state, resulting in assembling the main body 1 in a hexagonal cylinder shape with the aid of the bottom board 2.

Subsequently, as shown in FIG. 2, an excrement accepting bag 3 made of polyethylene or like synthetic resin material is put in the assembled main body 1 from its top surface-side opening. Then, a peripheral edge portion of the bag 3 is folded back to the outside, and suspended from an opening edge of the opening of the main body 1 to the side of the outer surface. The suspended peripheral edge portion of the bag is hooked at the opening edge.

Subsequently, as shown in FIG. 3, a seat 4 is fitted in an overlaid state to the opening edge of the opening of the main body 1 to thereby finish the assembly of a simplified toilet a as shown in FIG. 4. The seat 4 is formed in advance by separately cutting a corrugated board in an annular shape by means of blanking.

In case of using the simplified toilet thus assembled, the inside of the excrement accepting bag 3 made of the synthetic resin material is sprinkled with powder consisting of a hygroscopic synthetic resin material in advance. After a user who sits on the seat 4 of the simplified toilet a finishes defecation, the excrement accepting bag 3 made of the synthetic resin material is removed from the main body 1, and the opening of the bag 3 is closed for the disposal.

At this time, the hygroscopic synthetic resin powder preliminarily sprinkled over the inside of the excrement accepting bag 3 jellifies urine contained in the excrement to facilitate the disposal of the bag.

Further, in case where it is not necessary to use the simplified toilet repeatedly after the simplified toilet has been once used urgently within the compartment of an automobile, for instance, the simplified toilet is disassembled for storage by removing the bottom board 2 from the main body 1 and restored to its state previous to the assembly. On the other hand, in case where it is necessary to use the simplified toilet repeatedly after the simplified toilet has been once used within a bedroom or the like, the excrement accepting bag 3 is removed, and thereafter, the seat 4 is put back in its place. Then, the seat 4 is covered with a cover board 5 formed by separately cutting a corrugated board by means of blanking. The simplified toilet thus covered with the cover board is put in the corner of the bedroom or like desired places.

As described above, the main body 1, the bottom board 2 and the seat 4 or the like, which are respectively formed by cutting the corrugated board as the material into predetermined shapes by means of blanking, are assembled into the simplified toilet a, and the simplified toilet a thus assembled is freely disassembled. Thus, when the simplified toilet a is not used, the bottom board 2 is removed from the bottom of the main body 1, and facing portions on the left and right of the annularly peripheral wall of the main body 1 are brought close to each other to ultimately overlap each other. By so doing, it is possible to fold up the main body 1. Therefore, an advantage of the simplified toilet is that the simplified toilet is carried and stored with ease.

However, the conventional simplified toilet requires a troublesome operation when the main body 1 is assembled in a roughly hexagonal cylinder shape, since, in operation, the internal space of the main body 1 in the folded state is expanded into a hexagonal cylinder shape, and the bottom board 2 is bent in an inverse V-letter shape in front to reduce the lateral width of the bottom board and is forced in the internal space of the main body 1 from under the main body. Further, in operation, the engaging projection pieces 20 . . . formed on the peripheral edge of the bottom board are inserted into the engaging window holes 10 . . . bored in portions close to the bottom of six wall surfaces of the main body 1, and in this state, the bottom board 2 is pushed back downward and restored to its flat state, so that the peripheral edge of the bottom board 2 is brought into pressure contact with the inner surface of the peripheral wall of the main body 1 and functions as a beam for holding the peripheral wall of the main body 1 expanded to assemble the main body 1 in the roughly hexagonal cylinder shape.

When the bottom board 2 of the roughly hexagonal shape in plan is bent in the inverse V-letter shape in front, the engaging projection pieces 20 . . . projecting from six side edges of the bottom board cause a difference in height between each engaging projection piece 20 projecting from the side edge parallel to the fold line w and each engaging projection piece 20 projecting from the side edge diagonally crossing the fold line w. Therefore, it becomes difficult to make all the engaging projection pieces 20 . . . correspond to all the engaging window holes 10 . . . respectively bored in six wall surfaces of the peripheral wall of the main body 1. Thus, either of the engaging projection pieces 20 projecting from the side edges parallel to the fold line w and the engaging projection pieces 20 projecting from the side edges diagonally crossing the fold line w are forcibly bent. Therefore, there is caused a problem in that the engaging projection pieces 20 . . . are damaged by the repetitive assembling and disassembling operations to make the assembly itself impossible.

SUMMARY OF THE INVENTION

The present invention is made to overcome the problems in the prior art. It is an object of the present invention to provide a new measure, in which a simplified toilet is assembled or disassembled promptly with ease by attaching or detaching a bottom board to and from a main body, while holding down the damage of engaging projection pieces projecting from the peripheral edge of the bottom board to the minimum, and the assembly of the simplified toilet is performed with accuracy by connecting the bottom board and the main body together.

According to the present invention, as a measure for attaining the above object, there is provided a portable-type simplified toilet comprising a foldable main body of a cylinder shape formed by butting end-to-end portions of a corrugated board cut in a band-like shape and adhering the butted ends to each other in an overlapped state, the main body having engaging window holes bored in lower portions of the peripheral wall of the main body so as to be positioned at equal distances from an imaginary line in the longitudinal direction of the main body, and a bottom board separately made of a corrugated board and having a fold line extending in the longitudinal direction and engaging projection pieces projecting from the peripheral edge of the bottom board so as to be positioned at equal distances from the fold line, the engaging projection pieces being inserted into the engaging window holes.

According to the present invention, the engaging projection pieces projecting from the peripheral edge of the bottom board are provided at equal distances from the fold line, along which the bottom board is bent when being inserted into the internal space of the main body. Thus, when the bottom board is bent in the inverse V-letter shape in front, an operation of making all the projection pieces of uniform height is easily performed. Further, an operation of inserting the engaging projection pieces into the engaging window holes provided in the peripheral wall of the main body is easily performed without bending the engaging projection pieces against the bottom board. Thus, an assembling operation is facilitated, and the bottom board and the main body are firmly connected together after the assembly.

As described above, the simplified toilet according to the present invention has the foldable main body of a cylinder shape formed by butting end-to-end portions of the corrugated board cut in a band-like shape and adhering the butted ends in an overlapped state. The simplified toilet also has the bottom board separately formed by the corrugated board. The bottom board is bent in the inverse V-letter shape according to the fold line extending in the longitudinal direction and is inserted into the inner space of the main body 1 from under the main body. Subsequently, the engaging projection pieces projecting from the side edges are faced to the wall surfaces of the main body, and in this state, the bottom board is pressed downward and restored to its flat state. By so doing, the engaging projection pieces are inserted into the engaging window holes to assemble the main body in a predetermined shape. In this case, since the engaging projection pieces projecting from the side edges of the bottom board are arranged at equal distances from the fold line, it is possible to make all the engaging projection pieces of uniform height. Thus, the engaging projection pieces are easily inserted into the engaging window holes without forcibly bending the engaging projection pieces, so that the assembling operation is performed promptly with accuracy.

Further, when the simplified toilet is disassembled, the bottom board is pushed up from the bottom. By so doing, since the engaging projection pieces easily come out of the engaging window holes, a disassembling operation is also performed with ease.

BRIEF DESCRIPTION OF THE DRAWINGS

The foregoing and other objects and features of the invention will become apparent from the following description of preferred embodiments of the invention with reference to the accompanying drawings, in which:

FIG. 8 is a perspective view showing a bottom board of the portable-type simplified toilet of the present invention;

FIG. 9 is a perspective view showing the bottom board of the portable-type simplified toilet of the present invention when turned out;

FIG. 10 is a perspective view showing the bottom board of the portable-type simplified toilet of the present invention when bent in an inverse V-letter shape according to a fold line;

FIG. 11 is a perspective view showing a main body of the portable-type simplified toilet of the present invention when folded;

FIG. 12 is a plan view showing the main body of the portable-type simplified toilet of the present invention when folded;

DESCRIPTION OF THE PREFERRED EMBODIMENTS

Figure 1:
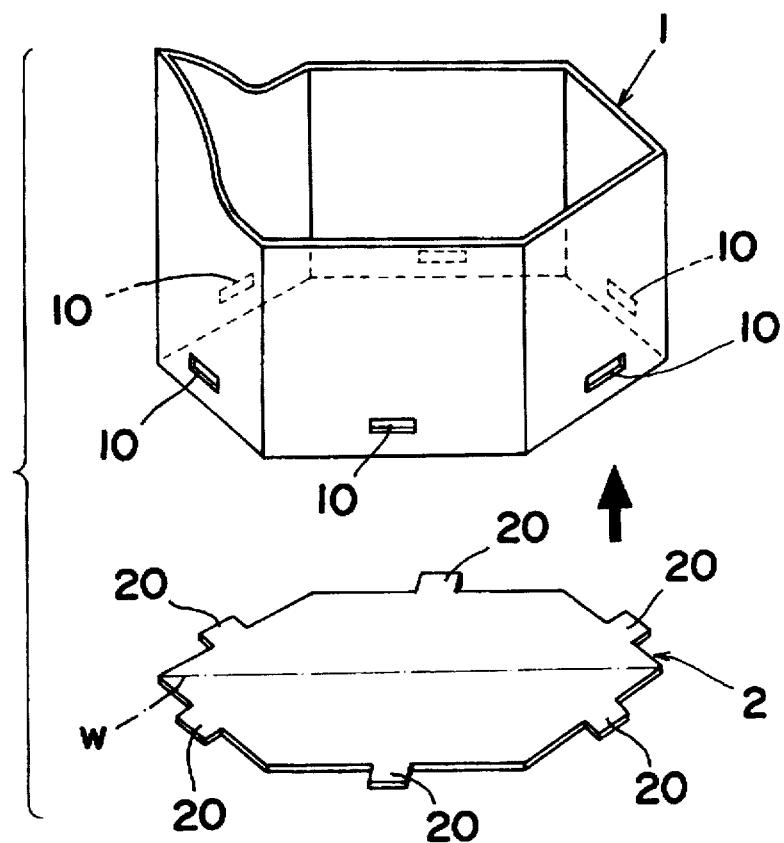
FIG. 1 is a perspective view showing a freely-assembled or disassembled portable-type simplified toilet in a prior art in the way to assembly.
Figure 2:
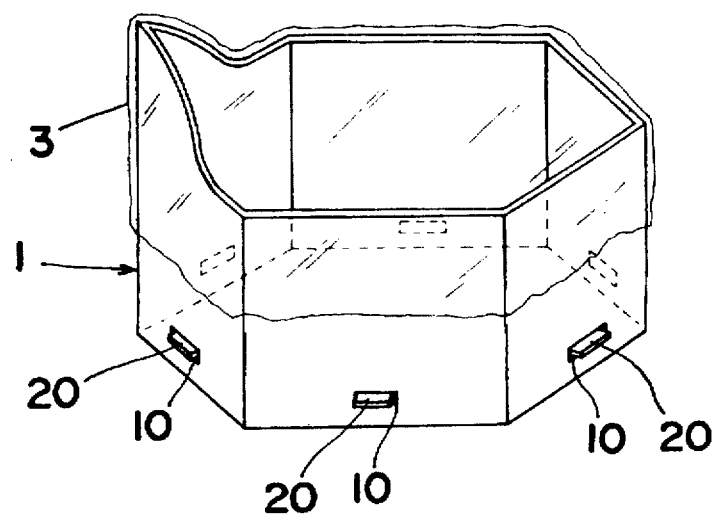
FIG. 2 is a perspective view showing the portable-type simplified toilet of FIG. 1 when an excrement accepting bag made of polyethylene or the like is installed.
Figure 3:
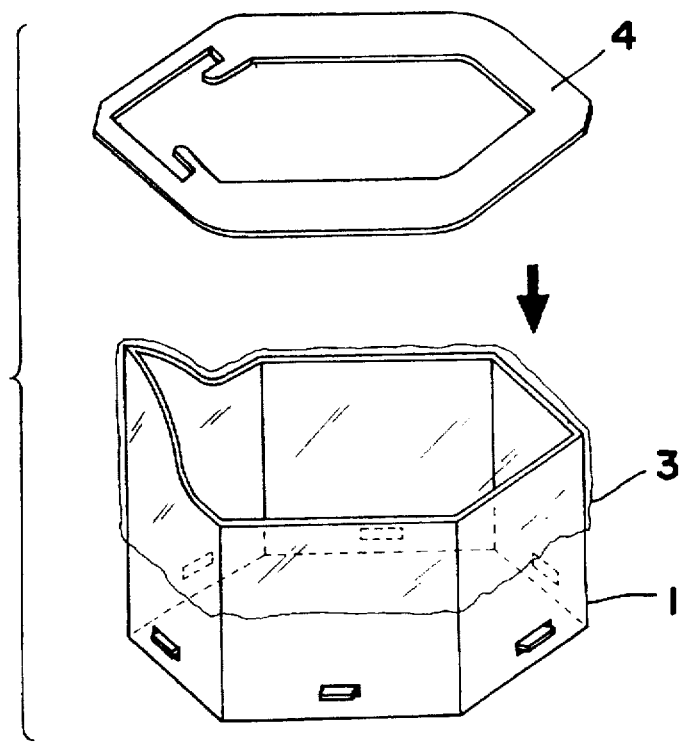
FIG. 3 is a view for explaining the portable-type simplified toilet of FIG. 1 when a seat is attached.
Figure 4:
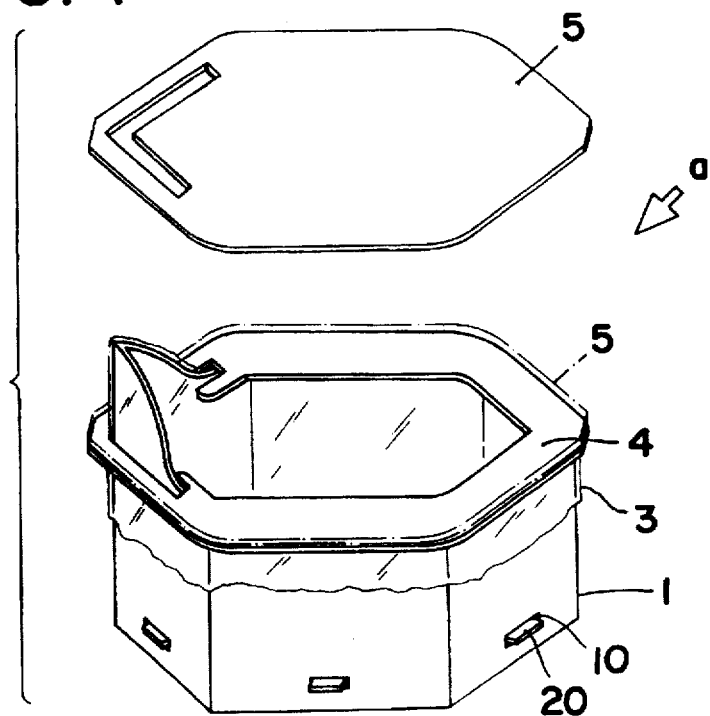
FIG. 4 is a view for explaining the portable-type simplified toilet of FIG. 1 when a cover board is mounted.

In the drawings, the same reference numerals are used for structures having effects identical with those of conventional structures.

Figure 5:
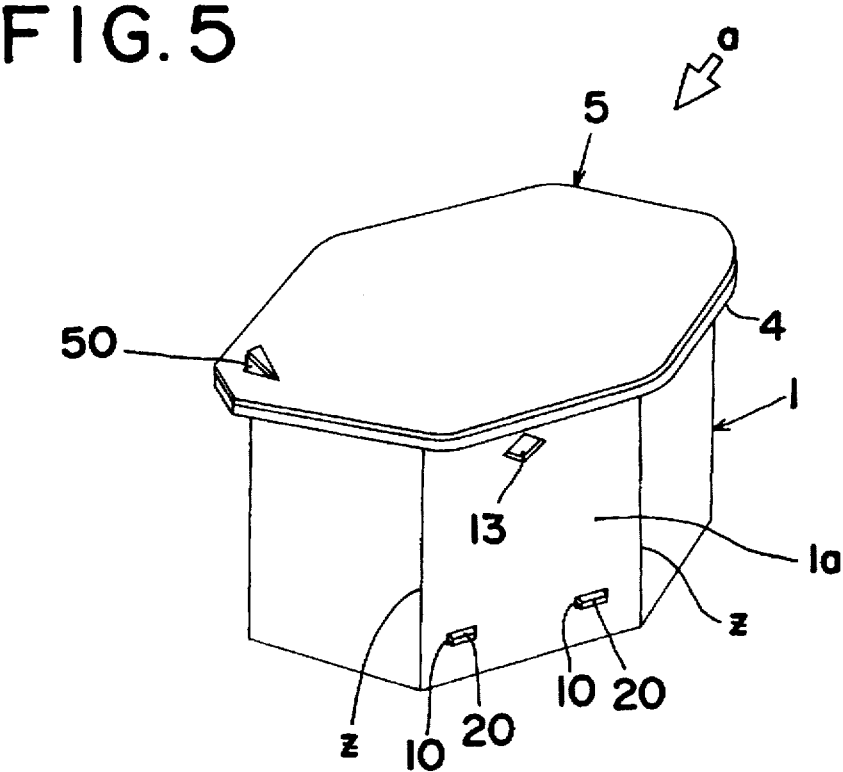
FIG. 5 is a perspective view showing a freely-assembled or disassembled portable-type simplified toilet according to the present invention when stored.
Figure 6:
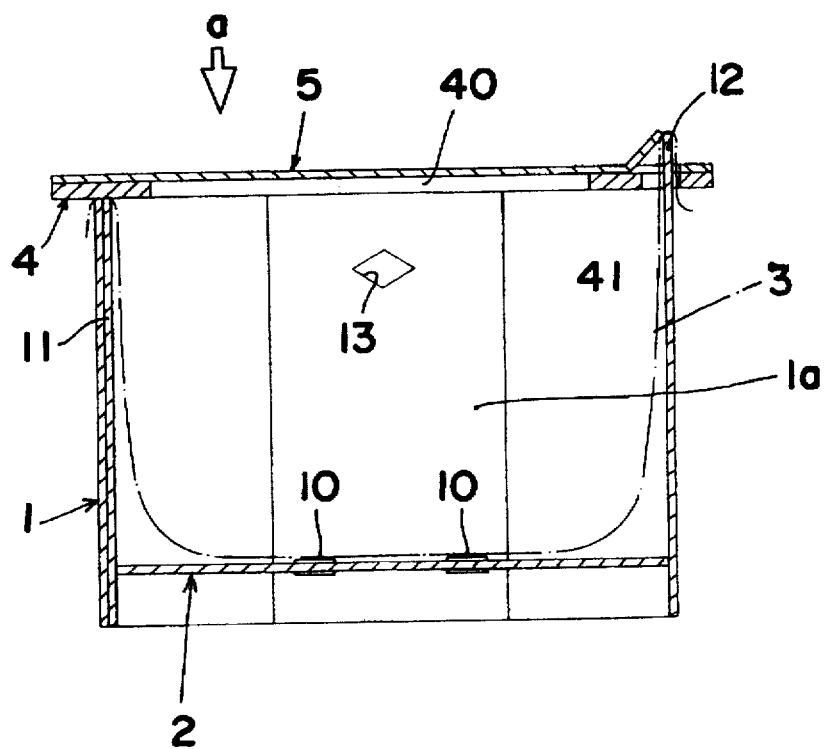
FIG. 6 is a longitudinal sectional side view of the portable-type simplified toilet of the present invention.
Figure 7:
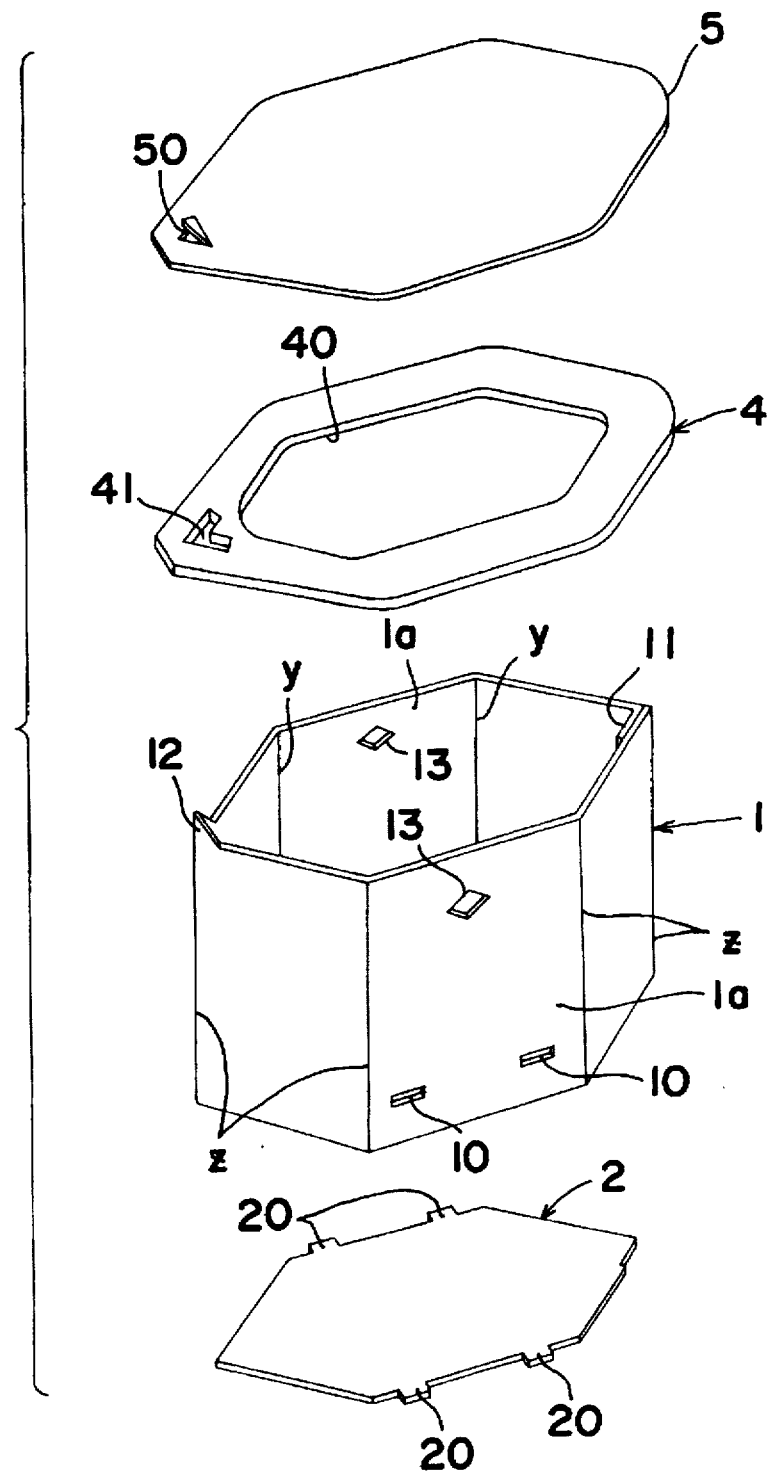
Fig. 7 is an exploded perspective view of the portable-type simplified toilet of the present invention.
Figure 13:
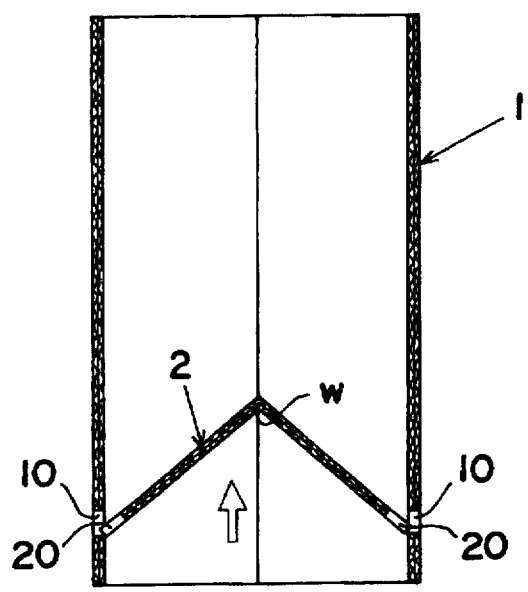
FIG. 13 is a view for explaining the bottom board when attached to the main body of the portable-type simplified toilet of the present invention.

FIG. 5 is a perspective view showing the overall structure of a simplified toilet a in the assembled state according to the present invention. FIG. 6 is a longitudinal sectional side view of the same, and FIG. 7 is an exploded perspective view of the same. In the drawing, reference numeral 1 means a main body of a toilet, 2 is a bottom board, 3 is an excrement accepting bag, 4 is a seat, 5 is a cover board, 10 is an engaging window hole bored in a portion close to the bottom of a peripheral wall of the main body 1, and 20 is an engaging projection piece projecting from a peripheral edge of the bottom board 2.

A corrugated board composed of a lamination of two sheets adhered to each other is used as the material of the main body 1. The corrugated board is cut into a band-like board material of approximately 30 cm in width and approximately 90 cm in length. A fold line extending in a direction orthogonal to the longitudinal direction of the band-like board material is provided on the inner surface of the band-like board material at intervals of approximately 15 cm in the longitudinal direction. Then, the band-like board material is bent according to the fold lines y . . . and rolled in a cylinder shape. Subsequently, butted ends of the band-like board material thus rolled are adhered to each other with an adhesive. Thus, the main body 1 is formed in a hexagonal cylinder having six peripheral wall surfaces defined by edge lines z on the outer surface resulting from bending the band-like board material according to the fold lines y . . . described above.

The main body 1 has engaging window holes 10 . . . bored in portions close to the bottom of the peripheral wall of the main body and allowing the insertion of the engaging projection pieces 20 projecting from the peripheral edge of the bottom board 2. The engaging window holes 10 . . . are only provided in a pair of left and right wall surfaces parallel to each other in the longitudinal direction (i.e., in the lateral direction in FIG. 6) among six wall surfaces of the peripheral wall of the main body 1.

Namely, the main body 1 is set up such that when the end-to-end portions of the band-like board material to form the main body 1 are adhered to each other in an overlapped state, an overlap portion 11 to form the band-like board material in a cylinder shape is set as a rear end of the main body, and a portion opposite to the overlap portion is set as a front end. The main body 1 also has a projection piece 12 provided on the top surface on the side of the front end of the main body and inserted into an insertion hole 41 formed in the seat 4. Then, a plurality of engaging window holes 10 . . . are provided only in the lower end of the left and right wall surfaces 1a, 1a parallel to an imaginary line in the longitudinal direction of the main body and are arranged in parallel to each other in the longitudinal direction in such a state that the overlap portion 11 and the projection piece 12 are respectively positioned at the front end and the rear end of the main body. Since the engaging window holes 10 . . . should be positioned at equal distances from the imaginary line, the engaging window holes 10 . . . are provided only in the left and right wall surfaces 1a, 1a parallel to the imaginary line in the longitudinal direction. In case where a main body 1 of a cylinder or elliptical cylinder shape is formed instead of that of the hexagonal cylinder shape, the engaging window holes 10 . . . are provided in the peripheral wall so as to be positioned at equal distances from the imaginary line.

The main body 1 has also a pair of window holes 13, 13 provided in portions close to the upper end of the left and right wall surfaces 1a, 1a of the peripheral wall of the main body 1 and arranged on the left and right sides of the main body to face to each other. The window holes 13, 13 are adapted to grasp the main body 1 so as to lift and carry the assembled simplified toilet a.

The bottom board 2 is formed by cutting a corrugated board in a roughly hexagonal shape in plan, as shown in FIG. 7. The bottom board 2 has the engaging projection pieces 20 projecting from the peripheral edge correspondingly to the engaging window holes 10 . . . bored in the peripheral wall of the main body 1. Further, the bottom board 2 has a fold line w provided on the underside and extending in the longitudinal direction along the center line which defines the left and right sides of the bottom board, as shown in FIG. 9.

However, the engaging projection pieces 20 projecting from the peripheral edge of the bottom board 2 are provided only on the pair of left and right side edges 2a, 2a parallel to the fold line w among six side edges of the peripheral edge of the bottom board 2. Further, the engaging projection pieces 20 are formed on each of the pair of side edges 2a, 2a such as to be arranged in parallel to each other in the longitudinal direction.

Thus, the engaging projection pieces 20 . . . projecting from the peripheral edges of the bottom board 2 are respectively positioned at equal distances from the fold line w.

Since the engaging projection pieces 20 should be positioned at equal distances from the fold line w, the engaging projection pieces 20 . . . are provided only on the side edges 2a, 2a parallel to the fold line w. In case where a bottom board 2 of a circular or elliptical shape in plan is formed to assemble a main body 1 in a cylinder or elliptical cylinder shape, the engaging projection pieces are respectively formed on the peripheral edge of the bottom board 2 such as to be positioned at equal distances from the fold line w.

Further, in the illustrated embodiment, two engaging projection pieces 20 are respectively formed on the front end and the rear end of each of the pair of left and right side edges 2a, 2a. Alternately, three or four pieces of engaging projection pieces may be provided in some cases.

The seat 4 is formed annularly so as to have a central opening 40 overlapped with an opening of the main body 1 after the seat 4 is overlaid on the upper edge of the main body 1, which is assembled in the hexagonal cylinder shape by attaching the bottom board 2 to the main body 1. The seat 4 has an insertion hole 41 provided in the front end and allowing the insertion of the projection piece 12 provided on the front end of the upper edge portion of the main body 1 so as to determine the position of the seat 4 relatively to the main body 1.

Further, in some cases, the seat 4 has a stopper provided on the underside and connected to the outer surface of the upper edge of the peripheral wall of the main body 1 to prevent the seat 4 from the lateral movement relative to the main body 1, when the seat 4 is mounted on the upper surface of the main body 1.

The cover board 5 has a roughly hexagonal shape overlapped with the upper surface of the seat 4 described above. The cover board 5 has an insertion notch 50 formed in the front end and allowing the insertion of the tip end of the projection piece 12 projected from the insertion hole 41 of the seat 4.

The simplified toilet a according to the present invention is assembled in the following. The main body 1 folded as shown in FIGS. 11 and 12 is expanded such that the projection piece 12 is positioned at the front end and the overlap portion 11 is positioned at the rear end, as shown in FIG. 7. Subsequently, both left and right sides of the bottom board 2 are bent downwards according to the fold line w as shown in FIG. 10. Thus, the bottom board 2 bent in an inverse V-letter shape in front is forced into the expanded main body 1 from under the main body such that the fold line w extends in the longitudinal direction of the main body 1.

Figure 14:
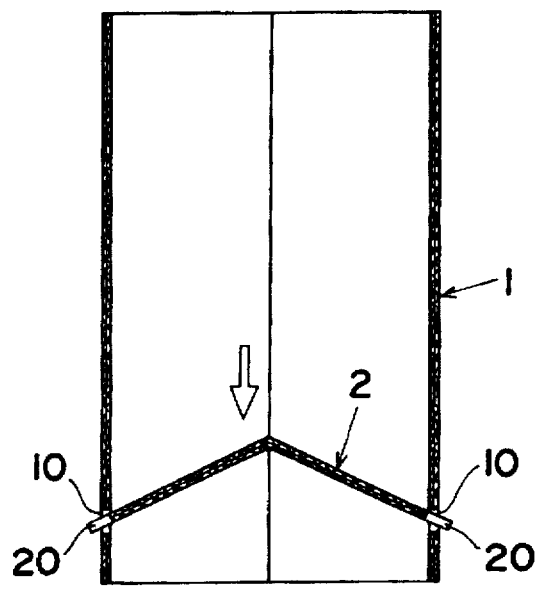
FIG. 14 is a view for explaining a process of attaching the bottom board to the main body of the portable-type simplified toilet of the present invention.
Figure 15:
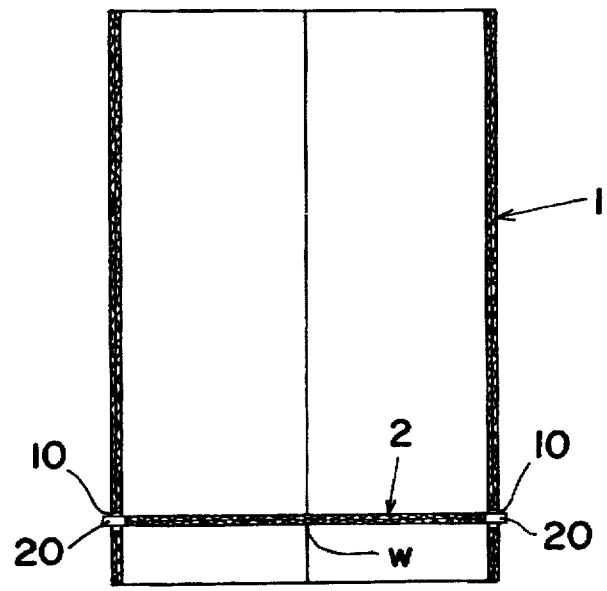
FIG. 15 is a longitudinal sectional front view showing the bottom board when attached to the main body of the portable-type simplified toilet of the present invention.

By so doing, the left and right side edges 2a, 2a parallel to the fold line w of the bottom board 2 are forced into in parallel to the left and right wall surfaces 1a, 1a of the main body 1. Then, after the engaging projection pieces 20 projecting from the side edges 2a, 2a are brought into alignment with the engaging window holes 10 . . . provided in the wall surfaces 1a, 1a of the main body 1, the upper surface of the bottom board 2 is pressed downwards with hands from above the main body 1 as shown in FIG. 14 to restore the bottom board 2 to its flat state. Consequently, the engaging projection pieces 20 . . . projecting from the side edges 2a, 2a are inserted into the engaging window holes 10 . . . of the wall surfaces 1a, 1a of the main body 1, thus resulting in completing the assembly of the main body 1.

In assembly of the simplified toilet, since the engaging projection pieces 20 . . . projecting from the side edges 2a, 2a of the bottom board 2 are provided only on the side edges 2a, 2a parallel to the fold line w, the engaging projection pieces 20 are positioned at equal distances from the fold line w. Thus, even when the bottom board 2 is bent in an inverse V-letter shape according to the fold line w, all the engaging projection pieces 20 are positioned at equal distances from the fold line w. Therefore, an operation of making all the engaging projection pieces of uniform height is easily performed. As a result, when the engaging projection pieces 20 of the bottom board 2 are inserted into the engaging window holes 10 . . . of the wall surfaces 1a, 1a of the main body 1, the engaging projection pieces are easily brought into alignment with the engaging window holes. Further, the engaging projection pieces 20 are inserted into the engaging window holes 10 . . . without bending the engaging projection pieces against the bottom board 2.

Incidentally, the simplified toilet a according to the present invention is similar to that of the prior art in the following. In case of using the simplified toilet, the excrement accepting bag 3 made of polyethylene or like synthetic resin film is installed in the main body 1 as shown by chain lines in FIG. 6, and the inside of the excrement accepting bag 3 is sprinkled with hygroscopic synthetic resin powder. After the defecation, the excrement accepting bag 3 is removed from the main body for the disposal of the bag and all.

What is claimed is:

1. A portable-type simplified toilet, comprising:
   a foldable main body having a hexagonal cylinder shape formed by butting end-to-end portions of an elongated member made of corrugated card board when assembled;
   a plurality of engaging holes provided on the main body; and
   a bottom plate detachably mounted on a lower portion of the main body, said bottom plate made of a corrugated card board and formed in a hexagonal shape, said bottom plate having a fold line and a plurality of projection pieces formed on a peripheral edge thereof and engaged with the engaging holes when said simplified toilet is assembled;
   wherein said fold line coincides with a central straight line connecting a first vertex of the bottom plate to a second vertex of the bottom plate when said simplified toilet is assembled; and
   wherein each of said projection pieces is spaced at an equal distance measured from the central straight line when said simplified toilet is assembled.

2. A portable-type simplified toilet according to claim 1, wherein said main body has a pair of parallel walls parallel to the fold line and four inclined walls inclined to the fold line when assembled, and wherein none of said inclined walls have an engaging hole.

3. A portable-type simplified toilet according to claim 2, further comprising:
   window holes provided in upper portions of the wall surfaces parallel to the central straight line in a longitudinal direction along wall surfaces of peripheral walls of the main body, said window holes permitting a user to grasp said main body so as to carry the simplified toilet.

4. A portable-type simplified toilet according to claim 1, further comprising:
   window holes provided in upper portions of peripheral walls of the main body and positioned on both left and right sides of said main body, said window holes permitting a user to grasp said main body so as to carry the simplified toilet.

* * * * *